Dec. 29, 1931.  D. T. TURNER  1,838,887
DISPLAY SIGN
Filed June 19, 1931
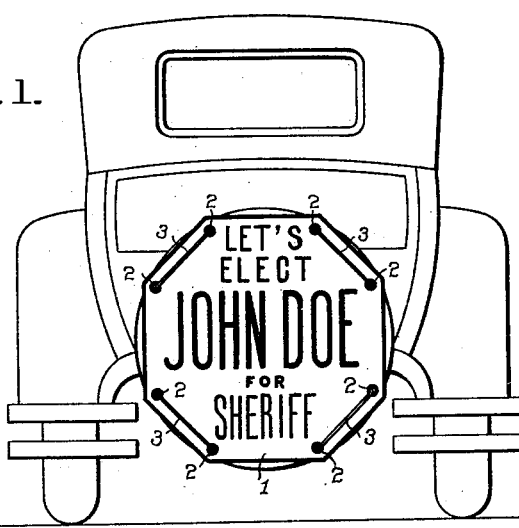
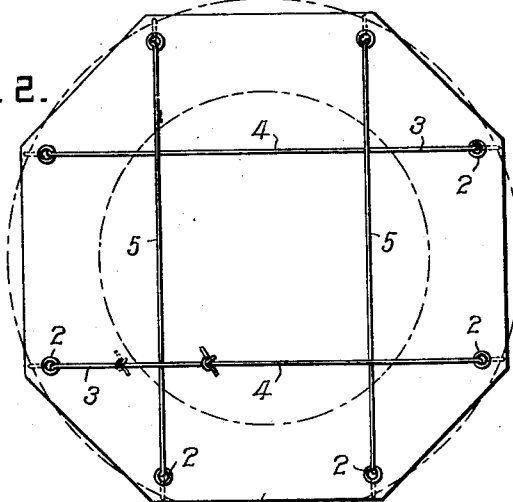
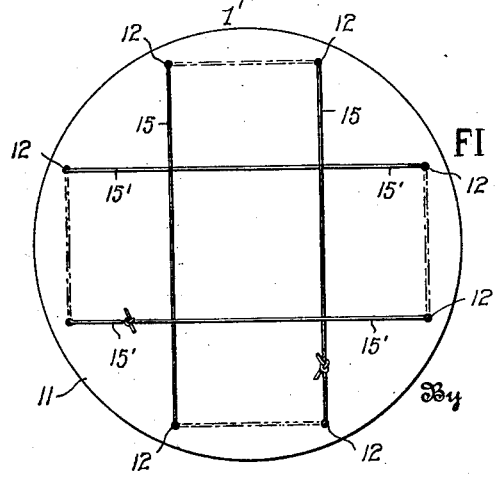
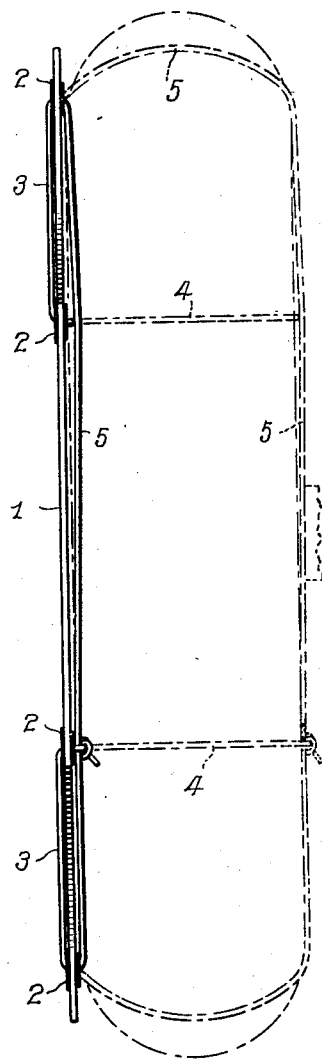
Inventor
D. T. TURNER
By Edgar M. Kitchin
his Attorney.

Patented Dec. 29, 1931

1,838,887

UNITED STATES PATENT OFFICE

DONALD T. TURNER, OF UNION CITY, INDIANA

DISPLAY SIGN

Application filed June 19, 1931. Serial No. 545,570.

This invention relates to improvements in that type of display signs especially adapted for application to and to be carried by the spare tire of an automobile or like support, and the essential object in view is the inexpensive but effective and easy manner of application and removal.

With these and other objects in view as will in part hereinafter become apparent and in part be stated, the invention includes a display placard, an elastic lacing engaging the placard in a manner to present at the rear face of the placard a retained framework of lacing especially well adapted for application over a spare tire or like support capable of being so applied easily and quickly and well adapted to effectively retain the placard in place during use.

The invention also comprises certain other novel constructions, combinations, and arrangements of parts as subsequently specified and claimed.

In the accompanying drawings,—

Figure 1 is a view in elevation of the rear of an automobile having an embodiment of the present invention applied to the spare tire thereof.

Figures 2 and 3 are respectively a rear elevation and edge view of an embodiment of the invention, a spare tire and the application of the anchoring means thereto being indicated in doted lines in each figure, and Figure 3 being on an enlarged scale over Figure 2 while Figure 2 is on an enlarged scale over Figure 1.

Figure 4 is a view similar to Figure 2 of a somewhat modified embodiment, the parts being seen on a reduced scale.

Referring to the drawings by numerals, 1 indicates a placard or sign, which is preferably of cardboard or the like, but may, of course, be of celluloid, metal, canvas, other woven fabric, or any other appropriate material. The marginal contour of placard 1 is, of course, susceptible of a wide range of variation, but when it is to be applied to the spare tire of an automobile, it is preferably shaped and proportioned with some respect to the tire to which it is to be attached; and, to this end, a highly acceptable marginal contour of the placard is that of an octagon with vertical and horizontal edges preferably slightly longer than the inclined edges, as clearly seen in Figures 1 and 2. But, of course, modification from this contour may be readily had without departure from the invention.

The placard 1 is perforated preferably approximately in or at the angles between the several lines of the octagon or other polygon to provide openings 2, 2, to receive the anchoring cable 3.

The cable 3 may be of various forms of material but preferably consists of a suitably stout cord of elastic material, and the cable is preferably threaded through the openings 2 in such a manner that a section or lap of the cable appears at the exposed face of placard 1 between the openings 2 at each of the four shorter sides of the octagon. By this arrangement, the cable may be laced to the condition at the back face of placard 1 seen in Figure 2. This form of lacing causes two parallel, horizontal lines 4, 4 of the cable to appear intersecting two parallel, vertical lines 5, 5, so that a rectangular space centrally located with respect to the placard is left, which rectangular space is adapted to permit (incident to the stretching of the cable 3) the introduction of a support in the space between the cable and the rear face of placard 1. This form of lacing is accomplished by inserting an end of cable 3 through one of the openings 2, say that at the left of Figure 2, spaced above the lowermost opening at the left of said figure. The opposite end of the cable from that passed through the opening is held against escape while the free end is returned through the opening 2 at the left and bottom of Figure 2, and then the said free end if passed through the opening 2 at the left and top of Figure 2 and over back through the opening 2 at the left and next to the top, and then the free end of the cable is passed through the opening 2 at the right on the same horizontal plane with the last-named opening 2 and the cable is then brought back through the opening 2 at the top and right of Figure 2, and then brought down vertically and inserted through the lowermost opening 2 at the right and then brought back through the remaining opening 2 at the right and across the placard 1 and tied or otherwise fastened to the retained end of the cable. The lacing is thus completed and the placard is ready for application to a support.

When the support is in the nature of a spare tire, the operator lifts the upper horizontal length 4 of cable 3 and spreads apart the vertical lengths 5 until they can be passed around and back of the tire, as indicated clearly in dotted lines in Figure 3, and then the lower horizontal section 4 is depressed and passed about the lowermost part of the tire to the back thereof, so that the several lines of cable 4, 4, and 5, 5, extend over the tread of the tire and across the back face thereof and thereby provide effective anchorage of the placard to the tire, tire portions extending outward through the space left between the several angles formed by the intersections of the cable sections 4, 4 and 5, 5.

It will be obvious, of course, that the placard is well adapted not only for application to spare tires at the rear of an automobile, and at the side of sides of an automobile, or otherwise, but also to any other appropriate support destined to offer opportunity for effective display of the placard.

When the placard 1 is made of such fragile material as cardboard or celluloid, or the like, it is preferable to provide eyelets or grommets for protecting the edge of the material about the openings 2, and even with canvas and other material of that kind grommets may well be employed.

Where the display sign is to be mounted under such conditions or on such support as is not exposed to wind pressure or other stresses of automobile spare tire displayes, as, for example, when applied to a spare tire in a display window or other like location, it is frequently sufficient to employ approximately one-half the amount of cable shown in Figure 2, and to use only two parallel lines of cable without the intersections.

In Figure 4 is seen a display sign quite similar to that just described and modified therefrom chiefly in having its periphery circular instead of polysided, and, in this modified embodiment the lacing may be slightly varied by employing two independent sections of cable or the identical lacing just above described may be utilized; or, as just indicated, a single pair of parallel sections may be provided for supporting the placard under conditions of shelter.

In the embodiment seen in Figure 4, 11 indicates the circular placard having the apertures 12, 12, spaced about the placard adjacent the periphery thereof, and when but a single pair of parallel cable sections only is to be used, the pair of apertures 12 at the top and the pair of apertures 12 at the bottom of Figure 4 may alone be provided; but where it is desired to use the form of placard seen in Figure 4 in such exposed conditions as on the spare tire of an automobile, the other apertures 12 will be provided and a cable will be laced either as seen in Figure 2 or as seen in Figure 4 wherein two independent pieces of sections of cable are employed, one being indicated at 15, laced through the upper and lower pairs of apertures 12 to produce parallel sections of cable at the rear face of the placard while the other piece of cable 15' is laced through the other pairs of apertures 12 with sections extending horizontally at the rear face of the placard so as to intersect the sections of cable 15 and thus give substantially the same mechanical effect as obtained by the lacing in Figure 2.

What is claimed is:—

1. A display sign comprising a placard and cable anchoring means therefor laced to the placard to provide a plurality of intersections of cable at one face of the placard located to enable insertion of a support in position to extend past the places of intersection between the placard and cable.

2. A display sign comprising a placard and elastic cable anchoring means therefor laced to the placard to provide a plurality of intersections of cable at one face of the placard located to enable insertion of a support in position to extend past the places of intersection, the lacing being such as to proportion the angles produced by the intersections to accommodate a support between the intersecting cable and placard incident to stretching of the cable, the support being of substantially the size of the placard.

3. A display sign comprising a placard and cable anchoring means therefor laced to the placard to provide a plurality of intersections of cable at one face of the placard located to enable insertion of a support in position to extend past the places of intersection, the lacing being such as to expose a minimum amount of the cable at the exposed face of the placard.

4. A display sign comprising a polysided placard having apertures through the placard substantially in the angles thereof, and supporting cable laced through said apertures and extending across the placard and providing intersecting lines of cable at one face of the placard for enabling a support to extend between the placard and the intersecting lines of cable to effectively connect the placard to the support.

5. A display sign comprising a polysided placard having apertures through the placard substantially in the angles thereof, and supporting cable laced through said apertures and extending across the placard and providing intersecting lines of cable at one face of the placard for enabling a support to extend between the placard and the intersecting lines of cable to effectively connect the placard to the support, the placard being octagonal and the cable being arranged with two vertical sections and two horizontal sections, the vertical intersecting the horizontal.

6. A display sign comprising a placard having spaced apertures and elastic cable means extending through the apertures, permanently engaging the placard, and laced across the placard in cable sections divided into parallel groups and one group intersecting the other and the cable means being located to receive a support between the placard and the intersecting groups for anchoring the placard to the support in positon for the placard to be exposed at one face of the support and for the placard to conceal so much of the support as is within the boundaries of the placard.

In testimony whereof I affix my signature.

DONALD THEODORE TURNER.